Dec. 18, 1956 L. E. NORTON 2,774,877

AUTOMATIC FREQUENCY CONTROL

Filed July 1, 1955 3 Sheets-Sheet 1

INVENTOR.
LOWELL E. NORTON
BY J. L. Whittaker
ATTORNEY

AUTOMATIC FREQUENCY CONTROL

Filed July 1, 1955 3 Sheets-Sheet 2

INVENTOR.
LOWELL E. NORTON
BY J. C. Whittaker
ATTORNEY

AUTOMATIC FREQUENCY CONTROL

Filed July 1, 1955 3 Sheets-Sheet 3

INVENTOR.
LOWELL E. NORTON
BY J. L. Whittaker
ATTORNEY

United States Patent Office 2,774,877

Patented Dec. 18, 1956

2,774,877

AUTOMATIC FREQUENCY CONTROL

Lowell E. Norton, Princeton, N. J., assignor to Radio Corporation of America, a corporation of Delaware Application July 1, 1955, Serial No. 519,371

19 Claims. (Cl. 250—36)

This invention relates generally to frequency stabilization systems employing molecularly resonant bodies of gas, and particularly to a system in which a pair of spectral lines exhibited by a single body of gas afford frequency stabilization of a pair of oscillators coupled thereto.

It is an object of the invention to provide an improved multi-frequency stabilization system employing a body of molecularly resonant gas.

Another object of the invention is to provide an improved frequency stabilization system in which at least two spectral lines exhibited by a single body of molecularly resonant gas are utilized to stabilize the frequency of a plurality of radio-frequency oscillators coupled to the body of gas.

Another object of the invention is to provide an improved system of the above type in which the outputs of at least two of the stabilized oscillators are utilized to produce a stable low frequency.

The foregoing and other objects and advantages are achieved in accordance with the invention by applying to a confined body of molecularly resonant gas coupling means from two oscillators, each oscillator providing an output at a separate frequency at which the gas exhibits molecular resonance. The coupled signals from the two oscillators are propagated through the single body of gas each signal independently undergoing therein both selective absorption and phase shift. After being subjected to the confined body of gas the two signal energies are separated and are separately applied to different comparison circuits. Each comparison circuit provides a control voltage of the proper amplitude and sense to stabilize the frequency of the oscillators associated therewith. The outputs of the two stabilized oscillators may then be utilized independently or may be beat together to produce a stabilized low frequency.

Figure 1:
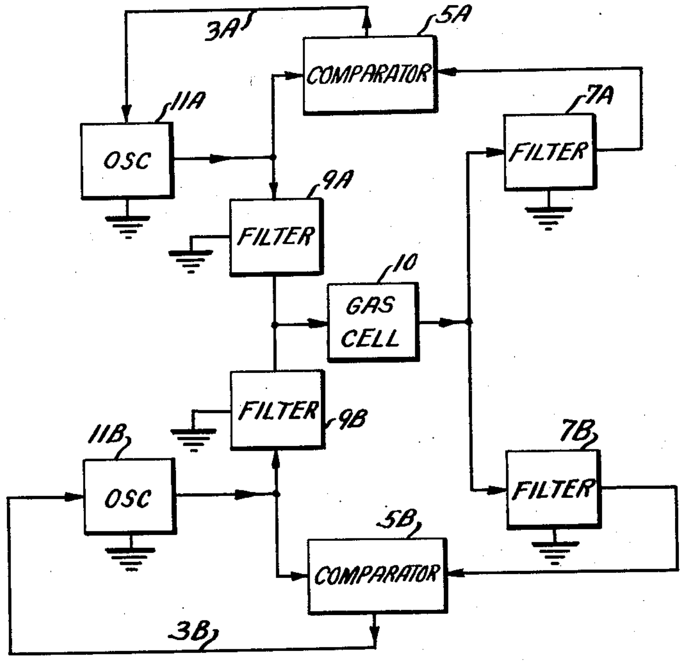
Figure 2A:
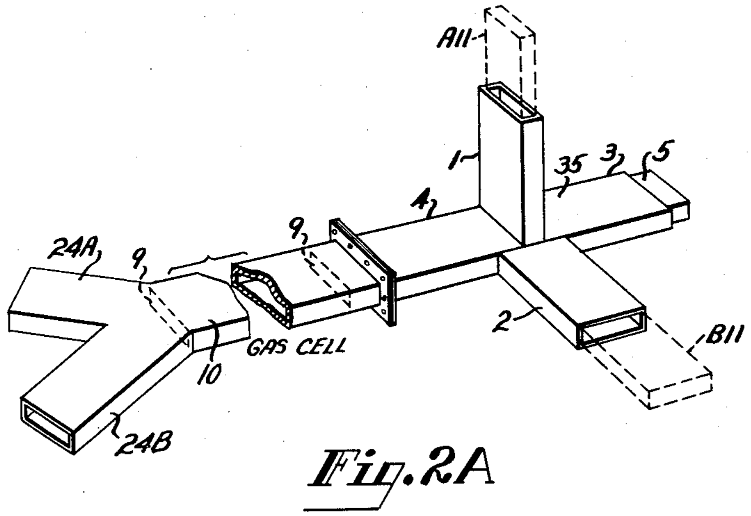
Figure 2:
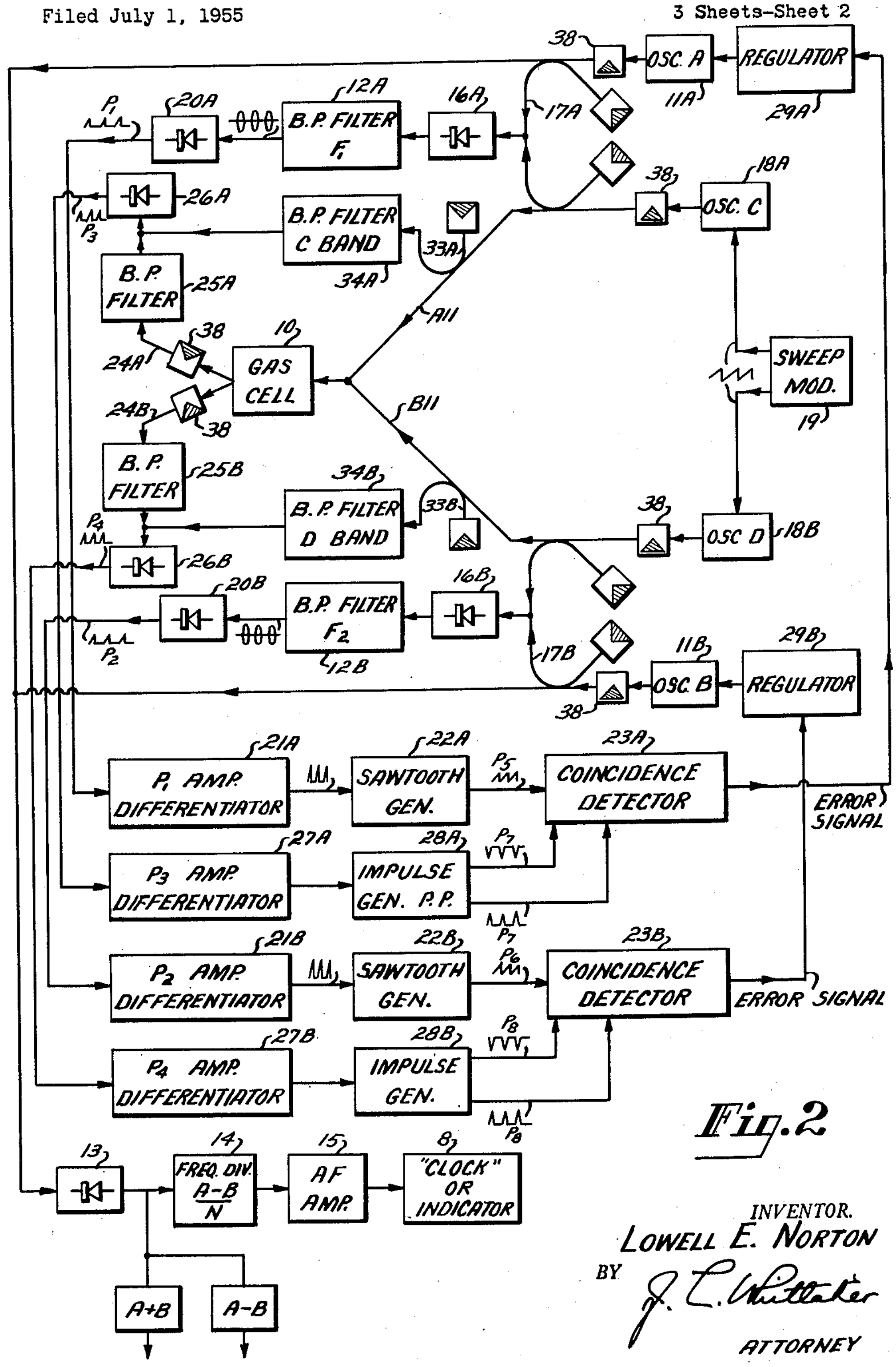
Figure 3:
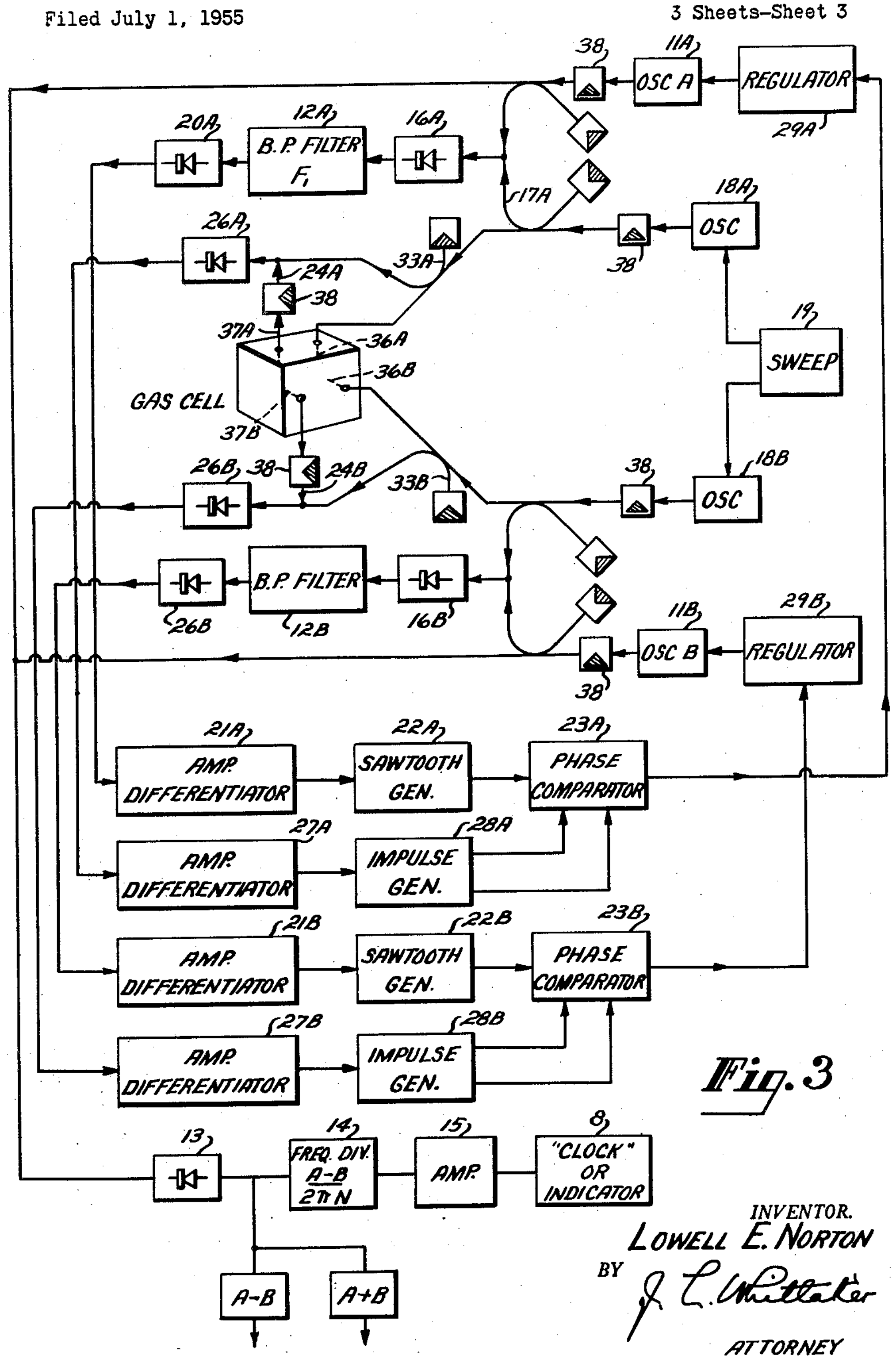

The invention will be described in detail with reference to the accompanying drawings in which:

Figure 1 is a schematic diagram, in block form, of a first embodiment of a frequency stabilization system, according to the invention;

Figure 2 schematically illustrates a second embodiment of the invention in which a frequency sweep technique is utilized for frequency stabilization;

Figure 2A is a perspective view of a gas cell and a microwave input junction therefor which may be used in the system of Figure 2; and Figure 3 is a modification of the system shown in Figure 2.

Similar reference characters are applied to similar elements throughout the drawings.

It is known that many gases including $NH_3$, COS, $CH_3OH$, $CH_3NH_2$, and $SO_2$ exhibit molecular resonances when confined at pressures of the order of tenth of a millimeter of mercury or less and irradiated by microwave energy whose frequency closely corresponds with a molecular frequency of the gas. As such low order of pressure, the mass absorption exhibited at near-atmospheric pressures breaks up into a multiplicity of discrete sharply defined lines defining a microwave spectrum characteristic of the particular gas. These molecular resonance spectral lines are extremely stable despite substantial variations in ambient conditions, such as temperature, pressure, and the like, and have an effective Q of the order of 50,000 and higher.

Referring to Figure 1, a gas cell 10 is provided containing one of the gases named above, ammonia, for example. A pair of oscillators 11A and 11B are coupled to the gas cell 10 via filters 9A and 9B. The oscillator 11A provides an output frequency corresponding with one spectral line exhibited by the gas, for example, the 9,7 ammonia line at 20,735.47 megacycles per second and the oscillator 11B provides an output frequency corresponding with a different spectral line of the gas, for example, the 8,6 ammonia line at 20,719.19 megacycles per second.

The filter 9A passes the 20,735.47 megacycle per second wave appearing at the output of the oscillator 11A whereas the filter 9B rejects this wave. Likewise filter 9B passes the 20,719.19 megacycle per second wave appearing at the output of the oscillator 11B and the filter 9A rejects the wave. Thus the outputs of each of the oscillators 11A and 11B are applied to the gas cell 10 without the output of one oscillator undesirably interacting with circuitry associated with the other oscillator.

In the gas cell 10 each wave, i. e., the wave at 20,735.47 megacycles per second and the wave at 20,719.19 megacycles per second independently and separately undergo both phase shift and energy absorption. The amount of phase shift and the amount of energy absorption depend upon the closeness in correspondence of the output frequencies of the two oscillators with the spectral line frequencies. When the two oscillators are "on frequency" the corresponding phase shifts due to molecular resonances are defined to be zero for each wave, and the corresponding absorptions are very close to their maximum values. When the output frequencies of one or both the oscillators deviate to be either higher or lower than their set-point frequencies, the amount of phase shift and absorption is different. Either the phase variation or the change in energy absorption of each of the waves may be utilized to produce control voltages for independently controlling the frequency of the two oscillators.

At the output of the gas cell 10 the two waves are applied to filters 7A and 7B. The filter 7A passes the phase shifted and attenuated wave at frequency 20,735.47 megacycles per second and rejects the phase shifted and attenuated wave at 20,719.19 megacycles per second. The filter 7B operates conversely and passes the wave at 20,719.19 megacycles per second and rejects the wave at 20,735.47 megacycles per second.

The output of the filter 7A is applied to a comparator circuit 5A to which also is applied a portion of the output of the oscillator 11A. Likewise, the output of filter 7B is applied to a different comparator circuit 5B to which is applied a portion of the output of the oscillator 11B. The comparators 5A and 5B may comprise either phase comparators or amplitude comparators, as desired.

The comparators 5A and 5B each produce at their outputs separate control voltages having an amplitude and sense proportional to frequency deviation which are applied to oscillators 11A and 11B, respectively, via feedback loops 3A and 3B to separately stabilize their frequencies.

Although the 9,7 and the 8,6 ammonia lines have been used above for purposes of illustration, other pairs of ammonia lines obviously may be employed, e. g., the 5,4 line (22,653.73 megacycles per second), the 1,1 line (23,694.49 megacycles per second), and the 2,2 line (23,722.59 megacycles per second). Also, other gases and mixtures of gases exhibiting other spectral lines may be used.

Referring to Figure 2, an embodiment of the invention is shown wherein a frequency sweep technique is employed for frequency stabilization. In Figure 2 the gas cell 10 has gas-sealing windows 9 (Figure 2A) of quartz or other material transparent to microwave energy. The gas cell has two input channels A11, B11, preferably waveguides, for impressing upon the gas cell two microwave frequencies respectively corresponding with two selected molecular frequencies of the gas.

The oscillator 11A is stabilized at a frequency A which is equal to one of the selected molecular frequencies ($G_1$) of the gas in cell 10 plus (or minus) the intermediate frequency $F_1$ (the center frequency of band-pass filter 12A) or to a sub-multiple of such algebraic sum; that is to say:

$$A=\frac{G_1\pm F_1}{M} \quad (1)$$

where M is an integer.

A second oscillator 11B is stabilized at a frequency B which is equal to the other selected molecular frequency ($G_2$) of the gas in cell 10 plus (or minus) the intermediate frequency $F_2$ (the center frequency of band-pass filter 12B) or to a sub-multiple of such algebraic sum; that is to say:

$$B=\frac{G_2\pm F_2}{L} \quad (2)$$

where L is an integer.

For simplicity of further description, it is assumed that frequency A is greater than frequency B. The two microwave frequencies A and B, which are stabilized in the manner described below, may be impressed upon a mixer 13, usually a crystal diode, to afford two additional output frequencies $(A+B)$ and $(A-B)$ rigidly determined by the two selected molecular frequencies of the gas in cell 10 in accordance with the relations of Equations 1 and 2. Preferably the difference frequency $(A-B)$ is low enough, i. e., not substantially above 30 megacycles, to be divided by a conventional type of frequency-divider 14 of division ratio N to produce a precise low frequency $$\frac{(A-B)}{N}$$

of the order of cycles per second and which may be used, after amplification by audio amplifier 15, to operate an electric clock or indicator 8 of great precision.

In explanation of the method of stabilization of oscillators 11A, 11B, the outputs of stabilized oscillators 11A, 11B are respectively impressed upon the mixers 16A, 16B, usually crystal diodes, through the directional couplers 17A, 17B.

Upon the mixer 16A is also impressed the output of an oscillator 18A whose frequency is varied, as by modulator 19, periodically to sweep over a band C of frequencies which includes one of the selected frequencies ($G_1$) of the gas in cell 10 and the frequency (A) of oscillator 11A plus (or minus, but not both) the pass frequency $F_1$ of filter 12A. Thus in each sweep cycle of oscillator 18A, the mixer 16A and filter 12A produce an output pulse whose peak occurs when the beat-frequency of oscillators 11A and 18A is equal to the pass frequency of filter 12A.

Upon the other mixer 16B is also impressed the output of oscillator 18B whose frequency is varied, as by modulator 19, periodically to sweep over a band D of frequencies which includes the other selected molecular frequency ($G_2$) of the gas in cell 10 and the frequency (B) of oscillator 11B plus (or minus, but not both) the pass frequency $F_2$ of filter 12B. Thus in each sweep cycle of oscillator 18B, the mixer 16B and filter 12B produce an output pulse whose peak occurs when the beat-frequency of oscillators 11B and 18B is equal to the pass frequency of filter 12B.

The width of each of the bands C and D is a small percentage of the corresponding carrier frequency; the band width, for example, may be five or ten megacycles, or less. By way of specific example, assuming the 1,1 and 2,2 lines of ammonia have been chosen for $G_2$ and $G_1$, that the center frequencies $F_1$, $F_2$ of filters 12A, 12B are each four megacycles, and that L and M are unity, the bands C and D swept by oscillators 18A, 18B may be 23,718 to 23,725 megacycles (C band) and 23,690 to 23,697 megacycles (D band).

The sweep frequency or repetition rate of modulator 19 or equivalent means for varying the frequency of search oscillators 18A, 18B is substantially different from the pass frequencies of filters 12A, 12B. It may, for example, be 60 cycles per second as produced by any suitable electronic or mechanical modulator. The modulation-frequency waveform is preferably saw-tooth. Separate modulators may be used for the two oscillators but a simpler system results by use of a common modulator.

In each sweep cycle of oscillator 18A, the output pulse of filter 12A is rectified by crystal diode 20A, or equivalent, and applied as pulse $P_1$ to an amplifier-differentiator 21A of any suitable type. The sharpened amplified pulse output of the amplifier-differentiator controls or triggers a saw-tooth generator 22A. Thus to one input circuit of phase-comparator or coincidence detector 23A is supplied a series or train of pulses $P_5$, each pulse occurring when the difference frequency of oscillators 11A, 18A corresponds with pass frequency $F_1$ of filter 12A.

Similarly in each sweep cycle of oscillator 18B, the output pulse of filter 12B is rectified, as by diode 20B, and applied as pulse $P_2$ to amplifier-differentiator 21B whose output controls saw-tooth generator 22B. Thus to one input circuit of coincidence detector 23B is supplied a series of pulses $P_6$, each occurring when the difference frequency of oscillators 11B, 18B corresponds with pass frequency $F_2$ of filter 12B.

Also in each sweep cycle of each of oscillators 18A, 18B their frequencies as applied to cell 10 sweep through the two selected molecular frequencies $G_1$ and $G_2$ of the gas confined therein to produce two microwave pulses at those two frequencies. The output channel 24A of gas cell 10 includes a filter 25A whose pass band rejects the frequencies swept by oscillator 18B but accepts at least that portion of band C swept by oscillator 18A which includes the selected molecular frequency $G_1$. The other output channel 24B of gas cell 10 includes filter 25B whose pass-band rejects the frequencies swept by oscillator 18A but accepts at least that portion of band D swept by oscillator 18B which includes the other selected molecular frequency $G_2$.

The band-pass filters 25A, 25B minimize the interaction otherwise occurring between the microwave energies supplied to rectifiers 26A, 26B respectively included in the output channels 24A, 24B of gas cell 10. The mixers 26A and 26B produce at their outputs pulses $P_3$ and $P_4$, respectively.

For enhanced depth of modulation and therefore increased amplitude of the pulse outputs $P_3$, $P_4$ of mixers 26A, 26B, the absorption cell 10 is bridged by two paths respectively connecting each of the input channels A11, B11 to the corresponding output channels 24A, 24B. Specifically, the input channel A11 is connected to mixer 26A by directional coupler 33A and filter 34A which passes frequency band C and the input channel B11 is connected to mixer 26B by directional coupler 33B and filter 34B which passes band D. Relative phasing over the two paths to mixer 26A, and over the two paths to mixer 26B, in each case provides essentially zero input to mixer 26A, and to mixer 26B, except in the frequency interval defined by each spectral line.

Thus in each sweep cycle of oscillator 18A, there is impressed upon rectifier 26A microwave energy which is sharply peaked at the selected molecular frequency $G_1$ of the gas in cell 10; and in each sweep cycle of oscillator 18B there is impressed upon rectifier 26B microwave energy which is sharply peaked at the other selected molecular frequency $G_2$ of the same confined body of gas.

The output pulse $P_3$ of rectifier 26A is applied to amplifier-differentiator 27A whose sharpened amplified pulse output controls or triggers a push-pull impulse generator 28A to produce a pair of sharp output pulses $P_7$ which are applied to the second input circuit of coincidence detector 23A. The output of detector 23A is a direct-current "error" signal whose sense and amplitude correspond with the sense and extent of the deviation of the frequency of oscillator 11A from its desired precise value A. This error signal is utilized in manner per se known to stabilize oscillator 11A at its proper frequency. For example, it may be used automatically to control regulator 29A suitably to vary the frequency-control voltage of an electrode of the oscillator tube which may be of the klystron, magnetron or other microwave type, or it may be used to vary the frequency-control voltage of an associated reactance tube.

Similarly the output pulse $P_4$ of rectifier 26B is applied to amplifier-differentiator 27B whose sharpened amplified pulse output controls or triggers push-pull impulse generator 28B to produce a pair of sharp output pulses $P_8$ which are applied to the second input circuit of the coincidence detector 23B. The output of detector 23B is a D. C. "error" signal whose sense and amplitude correspond with the sense and extent of deviation of the frequency of oscillator 11B from its desired precise value B. This "error" signal is used for stabilizing the frequency of oscillator 11B as by controlling the voltage-regulator or reactance tube 29B associated with the oscillator tube.

With the oscillators 11A, 11B rigidly stabilized from the two selected molecular frequencies of the gas in cell 10, the difference of their frequencies and sub-multiples thereof in the output system of mixer 13 are also rigidly stabilized and are available as standards.

In some cases, use of a simple junction for connection of input channels A11, B11 to gas cell 10 may result in undesired interaction of the oscillators 18A, 18B. Such interaction, including pulling, may be avoided by using a magic-tee junction 35 as shown in Figure 2A. The two input channels are respectively connected to the cross-arms 1 and 2 of the magic-tee. Microwave energy entering arm 1 of the magic-tee (*a*) is propagated in side arm 3 where it is not reflected because of the matched termination 5; (*b*) is not propagated in arm 2 because of the cross-polarization; and (*c*) is propagated in side arm 4 which is connected to gas cell 10. The microwave energy entering cross-arm 2 of the magic-tee (*a*) is propagated in side arm 3 where it is absorbed at the matched termination 5; (*b*) is not propagated in arm 1 because of the cross-polarization; and (*c*) is propagated in side arm 4 which is connected to gas cell 10. Although the gas cell 10 is connected to both oscillators for excitation of two of its molecular frequencies, the input channels of the two oscillators are effectively decoupled from one another.

Another arrangement for avoiding interaction between channels respectively associated with oscillators 18A, 18B is shown in Figure 3. In the simplest form of this arrangement which effects decoupling by selected polarizations, the cross-sectional dimensions of the absorption cell A10 are so chosen that electromagnetic microwave energy may be propagated through the cell with its polarization parallel to either of the two cross-sectional dimensions.

The output from oscillator 18A injected into cell A10 by input probe 36A has its polarization parallel to the width of the cell, i. e., one of the cross-sectional dimensions. Fields of this polarization are selectively picked up by output probe 37A, similarly oriented, to supply demodulator 26A with microwave energy whose transmission through the cell A10 is effected by one only of the two selected molecular frequencies of the gas. Bridging of the cell by a path including directional coupler 33 is again provided to increase effective modulation due to the selective absorption at said one of the molecular frequencies of the gas.

The output from oscillator 18B injected into cell A10 by input probe 36 has its polarization different from that of oscillator 18A. Specifically, the polarization of the microwave energy from oscillator 18B is parallel to the height of the cell, i. e., the other of its cross-sectional dimensions. Fields of this polarization are selectively picked up by the similarly oriented output probe 37B to supply demodulator 26B with microwave energy whose transmission through cell A10 is affected only by the other selected molecular frequency of the gas.

It is to be noted that the polarization selectivity of cell A10 effectively decouples the input channels A11, B11 from one another and also effectively decouples the output channels 24A, 24B from one another. Consequently, as shown in Figure 2, the band-pass filters 25A, 25B, 34A, 34B of Figure 1 may be omitted. In other respects the two systems are similar and the same reference characters have been used to identify corresponding components of both systems. Accordingly, it is to be understood that the discussion of Figure 2 is generally applicable to both Figures 2 and 3 and no further specific description of Figure 3 is here necessary. In both Figures 2 and 3 the blocks marked 38 represent attenuators included when necessary to avoid overload or saturation effects in the gas cell and in the mixers 16A, 16B; 26A, 26B.

What is claimed is:

1. A frequency stabilization system comprising, a cell containing a molecularly resonant body of gas at low pressure, at least a pair of radio-frequency oscillators coupled to said gas cell, means coupled to said gas cell for deriving from said gas cell a separate frequency control signal for each of said oscillators, and means coupled to said control signal deriving means for applying said separate control signals to said oscillators to stabilize their frequencies.

2. A frequency stabilization system comprising, a cell containing a molecularly resonant body of gas at low pressure, at least a pair of radio-frequency oscillators producing outputs at different radio frequencies at which said body of gas is resonant, means for applying said outputs to said gas cell, means coupled to said gas cell for deriving separate frequency control signals for each of said oscillators, and means coupled to said control signal deriving means for applying said separate control signals to said oscillators to stabilize their frequencies.

3. A frequency stabilization system comprising, a cell containing a molecularly resonant body of gas at low pressure, at least a pair of radio-frequency oscillators producing outputs at different frequencies at which said body of gas is resonant, means for applying said outputs to said gas cell, means coupled to said gas cell for deriving said oscillator outputs from said cell after said outputs undergo phase shift and energy absorption therein, means coupled to said deriving means for producing separate oscillator frequency control signals, and means for applying said separate frequency control signals to said oscillators to stabilize their frequencies.

4. A frequency stabilization system comprising, a cell containing a molecularly resonant body of gas at low pressure, a pair of radio-frequency oscillators producing first and second outputs at different frequencies at which said body of gas is resonant, means for applying portions of said outputs to said gas cell, means coupled to said gas cell for deriving said first and second oscillator outputs from said cell after said outputs undergo phase shift and energy absorption therein, first and second comparator circuits, means for applying to said first comparator circuit a portion of said first output and said phase shifted first output to produce a first frequency control signal, means for applying to said second comparator circuit a portion of said second output and said phase shifted second output to produce a second frequency control signal, and means for applying said first and second frequency control signals to said first and second oscillators, respectively, to stabilize their frequencies.

5. A microwave system comprising a single cell containing gas at low pressure for which it exhibits molecular resonance, two microwave sources supplying to said cell microwave frequencies respectively corresponding with different molecular frequencies of the gas in said cell, and electronic means utilizing the microwave outputs of said single cell to provide two frequencies determined by said molecular frequencies.

6. A microwave system as in claim 5 in which said gas cell has a pair of input channels respectively including said sources, and in which means is provided to minimize coupling between said input channels to avoid interaction between said microwave sources.

7. A microwave system as in claim 5 in which said microwave sources are coupled to said gas cell and decoupled from each other by a magic-tee junction having its cross-arms respectively connected to said sources and one of its side arms connected to said gas cell.

8. A microwave system as in claim 5 in which said gas is contained in a transmission path through which fields may be propagated with at least two separable polarizations, and in which said microwave sources are connected to said cell with different polarizations to excite different modes thereof at said different molecular frequencies of the gas and with substantial decoupling of said microwave sources.

9. A microwave system as in claim 5 in which said gas cell has input channels respectively including said microwave sources and output channels including demodulator means.

10. A microwave system as in claim 9 in which each output channel of the cell is connected to the corresponding input channel in advance of the demodulator therein by a bridging circuit including a directional coupler.

11. A microwave system as in claim 10 in which each bridging circuit additionally includes a filter passing the frequencies of the associated input circuit and excluding the frequencies of the other input circuit.

12. A microwave system comprising a cell containing gas at low pressure and having input and output channels, microwave sources respectively connected to different input channels of said cell, modulator means effecting variation of the frequency of said sources respectively over ranges including different molecular frequencies of the gas in said cell, and demodulators respectively in different output channels of said cell for producing pulses as the frequencies of said sources respectively sweep through the corresponding molecular frequency of the gas.

13. A microwave system as in claim 12 in which the pulse modulation depth is increased by bridging circuits each connected from one of said demodulators to the corresponding input circuit of the cell and each including a coupler.

14. A microwave system as in claim 12 additionally including in each bridging circuit a filter for passing the frequency range of the corresponding microwave source and excluding the frequency range of the other source.

15. A microwave system as in claim 13 in which the gas cell is excited by separable polarizations and in which the input channels are connected thereto with different polarizations to excite different modes thereof for different molecular frequencies of the gas in the cell and with substantial decoupling of the input and output channels of said different sources.

16. A microwave system comprising a cell containing gas at low pressure and having input and output channels, microwave means for exciting the gas in said cell to produce molecular resonances at two different frequencies, two oscillators, means including said gas cell and demodulator means in respective output channels of said gas cell for stabilizing said oscillators each at a frequency regulated by a corresponding one of the molecular resonances of the gas in said cell, and means including demodulator means in the output system of the stabilized oscillators for producing precise frequencies rigidly determined by the algebraic sum and difference of said molecular resonance frequencies of said body of gas.

17. A microwave system as in claim 16 in which said microwave means comprises modulated oscillators respectively included in different input channels of said gas cell and each sweeping a frequency range including one of said molecular frequencies of the gas, and in which the stabilizing means for each of the stabilized oscillators additionally includes a mixer for the frequencies of the corresponding stabilized and search oscillators, a filter for passing a selected beat-frequency in the output of said mixer, and a phase-comparator having input circuits respectively supplied by said mixer and by the demodulator means in a corresponding one of the output channels of said gas cell.

18. A microwave system as in claim 17 in which said input channels terminate respectively in cross-arms of a magic-tee junction having one of its side arms connected to said gas cell, and in which each of said output channels of the cell includes between the corresponding demodulator and the cell a filter passing the frequencies of the corresponding modulated oscillator and excluding the frequencies of the other modulated oscillator.

19. A microwave system as in claim 17 in which the gas cell is excited by separable polarizations and in which the input channels include probes positioned in the gas cell to excite different modes thereof and with decoupling of said input channels, and in which the output channels include cell probes positioned in the gas cell for selective response to the different molecular resonances and with decoupling of said output circuits.

No references cited.